(12) United States Patent
Krishnaswamy et al.

(10) Patent No.: US 8,538,753 B2
(45) Date of Patent: **\*Sep. 17, 2013**

(54) GENERATING REPRESENTATIONS OF GROUP INTERACTIONS

(75) Inventors: Anand Krishnaswamy, Chennai (IN); Rajeev Palanki, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,998

(22) Filed: Sep. 13, 2012

(65) Prior Publication Data

US 2013/0006628 A1    Jan. 3, 2013

Related U.S. Application Data

(63) Continuation of application No. 12/473,916, filed on May 28, 2009.

(51) Int. Cl.
*G10L 17/22* (2013.01)

(52) U.S. Cl.
USPC .......................................................... 704/235

(58) Field of Classification Search
USPC .......................................................... 704/235
See application file for complete search history.

(56) References Cited

U.S. PATENT DOCUMENTS

| | | |
|---|---|---|
| 5,696,879 A | 12/1997 | Cline et al. |
| 5,987,405 A | 11/1999 | Bantz et al. |
| 6,477,491 B1 | 11/2002 | Chandler et al. |
| 7,082,458 B1 | 7/2006 | Guadagno et al. |
| 8,068,595 B2 | 11/2011 | Odinak et al. |
| 2007/0033039 A1 | 2/2007 | Taylor |
| 2007/0071206 A1 | 3/2007 | Gainsboro et al. |
| 2008/0281600 A1 | 11/2008 | Kuppuswamy et al. |

OTHER PUBLICATIONS

United States Patent and Trademark Office, Office Action for U.S. Appl. No. 12/473,916, Mar. 19, 2012, pp. 1-8, Alexandria, VA, USA.
Andrew Zschorn, et al., Transcription of Multiple Speakers Using Speaker Dependent Speech Recognition, Technical Report DSTO-TR-1498, Sep. 2003, pp. 1-54, Command and Control Division, Information Sciences Laboratory, Defense Science and Technology Organization, Commonwealth of Australia.
J. Ajmera, et al., A Robust Speaker Clustering Algroithm, Proceedings of the IEEE Workshop on Automatic Speech Recognition and Understanding, 2003, pp. 411-416, IEEE Xplore.
Aniruddha Sen, et al., Indian accent text-to-speech system for web browsing, Journal: Sadhana, Feb. 2002, pp. 113-126, vol. 27, Part 1, Indian Academy of Sciences, India.
United States Patent and Trademark Office, Notice of Allowance for U.S. Appl. No. 12/473,916, Jul. 12, 2012, pp. 1-7, Alexandria, VA, USA.

*Primary Examiner* — Susan McFadden
(74) *Attorney, Agent, or Firm* — Lee Law, PLLC; Christopher B. Lee

(57) ABSTRACT

A transcript of a group interaction is generated from audio source data representing the group interaction. The transcript includes a sequence of lines of text, each line corresponding to an audible utterance in the audio source data. A conversation path is generated from the transcript by labeling each transcript line with an identifier identifying the speaker of the corresponding utterance in the audio source data. A representation of the group interaction is generated by associating the conversation path with a set of voice profiles, each voice profile corresponding to an identified speaker in the conversation path.

19 Claims, 4 Drawing Sheets

GENERATING REPRESENTATIONS OF GROUP INTERACTIONS

RELATED APPLICATIONS

This application is a continuation of and claims priority to and claims the benefit of U.S. patent application Ser. No. 12/473,916 titled "REPRESENTING GROUP INTERACTIONS," which has had a title change to "GENERATING REPRESENTATIONS OF GROUP INTERACTIONS," which was filed in the United States Patent and Trademark Office on May 28, 2009, and which has a current status of "Allowed," and this application is related to U.S. patent application Ser. No. 13/439,175 titled "REPRESENTING GROUP INTERACTIONS," which was filed in the United States Patent and Trademark Office on Apr. 4, 2012, both of which are incorporated herein by reference in their entirety.

BACKGROUND

People with hearing challenges frequently make use of speech to text conversion, or speech recognition, software. Their challenge is magnified when such software is applied to transcribe a group interaction such as a meeting or a panel discussion. Conventional speech recognition software focuses primarily on accuracy of transcription and not on differentiating incoming voice signals, and is often tuned to the characteristics of a particular speaker. Therefore, such software struggles to accurately transcribe the proceedings of a group interaction where several individuals interact unpredictably. In addition, the capability to identify a speaker for each utterance and capture this information in a compact transcript format that facilitates storage and management is highly desirable for this application.

It is further beneficial if the stored transcript can be used to regenerate the group interaction as audio data with some fidelity to the original. However, the output of existing text to speech conversion software is often monotonous, either because the transcript format does not record the emotional content of the speech, or the software cannot make use of such additional information.

In addition, group interactions often make use of, and generate information on, physical aids such as whiteboards. Conventional speech to text conversion software, by relying solely on the audio data, therefore neglects an important source of auxiliary information about the group interaction.

BRIEF SUMMARY

According to a first aspect of the invention, there is provided a method of generating a representation of a group interaction, the method comprising: generating a transcript of the group interaction from audio source data representing the group interaction, the transcript comprising a sequence of lines of text, each line corresponding to an audible utterance in the audio source data; generating a conversation path from the transcript by labeling each transcript line with an identifier identifying the speaker of the corresponding utterance in the audio source data; and generating the representation of the group interaction by associating the conversation path with a plurality of voice profiles, each voice profile corresponding to an identified speaker in the conversation path.

According to a further aspect of the invention, there is provided a method of regenerating audio data from a representation of a group interaction, the method comprising: extracting, from the representation of the group interaction: a conversation path comprising one or more transcript lines, each transcript line being labeled with an identifier identifying a speaker; and a plurality of voice profiles, each voice profile corresponding to an identified speaker in the conversation path; and regenerating audio data for the group interaction from the conversation path and the voice profiles.

According to a further aspect of the invention, there is provided a system for generating a representation of a group interaction, the system comprising: a transcription module adapted to generate a transcript of the group interaction from audio source data representing the group interaction, the transcript comprising a sequence of lines of text, each line corresponding to an audible utterance in the audio source data; and a labeling module adapted to: generate a conversation path from the transcript by labeling each transcript line with an identifier identifying the speaker of the corresponding utterance in the audio source data; and generate the representation of the group interaction by associating the conversation path with a plurality of voice profiles, each voice profile corresponding to an identified speaker in the conversation path.

According to a further aspect of the invention, there is provided a computer program product including a computer readable medium having recorded thereon a computer program for implementing any one of the methods described above. Other aspects of the invention are also disclosed.

BRIEF DESCRIPTION OF THE SEVERAL VIEWS OF THE DRAWINGS

One or more embodiments of the invention will now be described with reference to the drawings, in which.

DETAILED DESCRIPTION

Figure 1:
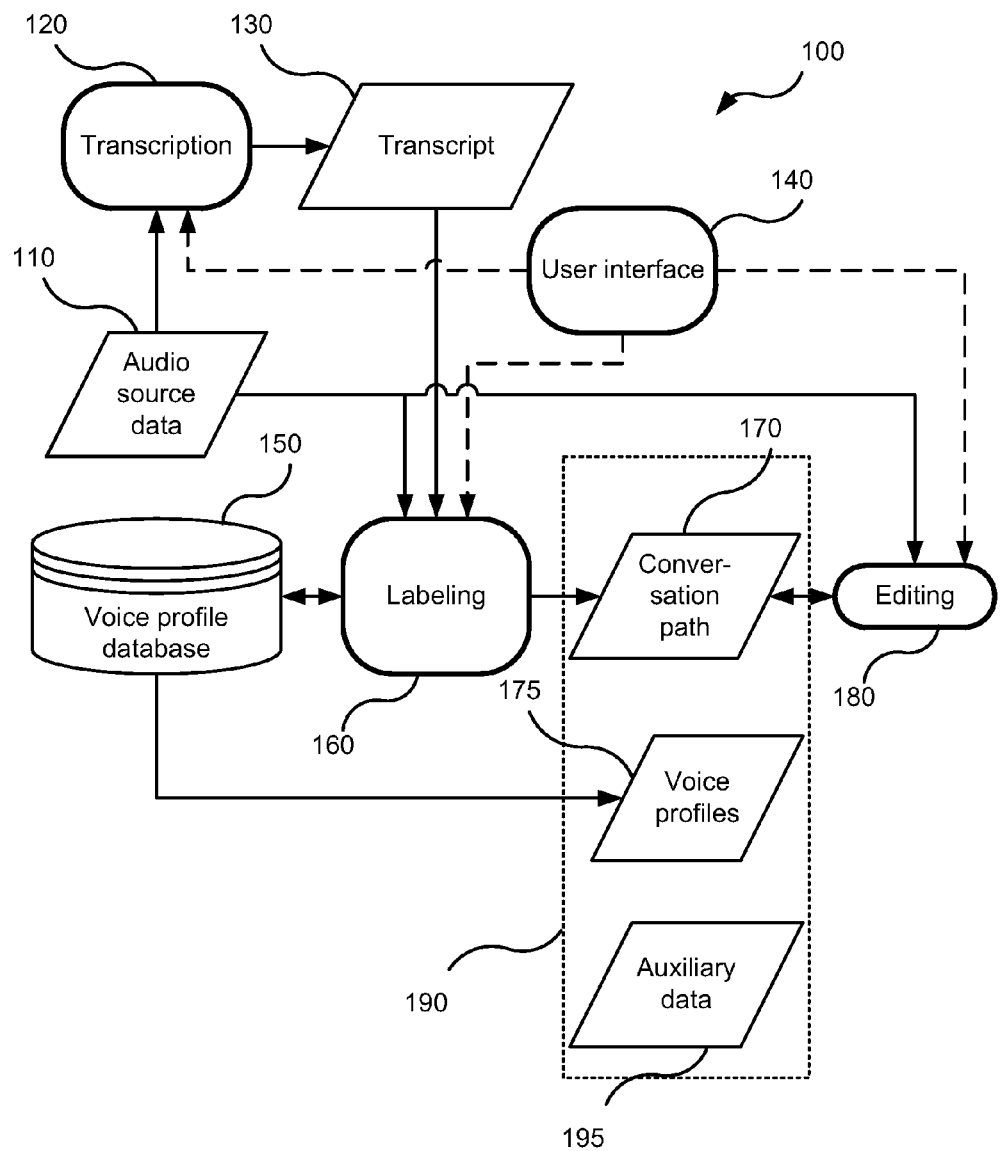
FIG. 1 is a block diagram of a system for group generating representations of group interactions according to one embodiment of the invention.

Where reference is made in any one or more of the accompanying drawings to steps and/or features, which have the same reference numerals, those steps and/or features have for the purposes of this description the same function(s) or operation(s), unless the contrary intention appears.

Disclosed herein are arrangements for generating a representation of a multi-person group interaction with some or all of the following characteristics:

- the representation identifies speakers of transcript lines;
- the representation facilitates editing, in particular re-labeling of transcript lines;
- the representation has associated data that is auxiliary to the interaction, such as documents, images, or other media data;
- the representation has qualifiers conveying information about the emotional content in which lines were spoken;
- the representation allows audio data representing the interaction to be regenerated.

Figure 4:
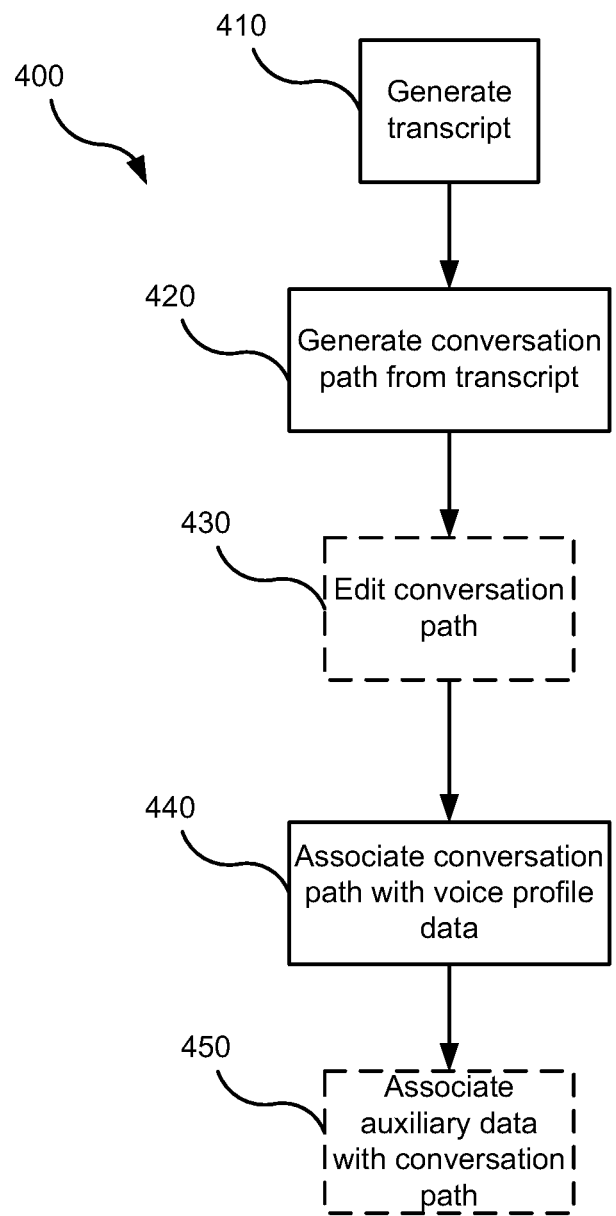
FIG. 4 is a flow diagram illustrating a method of generating a representation of a group interaction according to one embodiment of the invention.

FIG. 1 is a block diagram of a system 100 for generating representations of group interactions according to one embodiment of the invention. The system 100 will be described with reference to FIG. 4, which is a flow diagram illustrating a method 400 of generating a representation of a group interaction carried out by the system 100 according to one embodiment of the invention. In the system 100, a transcription module 120 generates (step 410) a transcript 130 from audio source data 110 representing the group interaction according to conventional speech to text processing (speech recognition) such as that provided by the IBM's ViaVoice™ product. The transcript 130 comprises a sequence of lines of text representing discrete audible utterances in the audio source data 110, and their associated times. The audio source data 110 can be obtained from one or more microphones (not shown) (real-time processing), or may be stored on, and retrieved from, a disk or other recording medium (batch processing).

The audio source data 110 is also used, along with the transcript 130, by a labeling module 160 to generate (step 420) a conversation path 170. The conversation path 170 contains the data from the transcript 130, supplemented by an identifier for each line of text identifying the speaker of the corresponding utterance in the audio source data 110. The labeling module 160 labels each line with a speaker identifier by comparing pitch and timing characteristics of the utterances in the audio source data 110 with one or more voice profiles, each representing and characterizing a unique speaker, stored in a voice profile database 150. If a speaker cannot be identified, the line is marked as unidentified in the conversation path 170. The labeling module 160 can be configured to generate an error message in such a case, to draw attention to any unrecognized participant in the group interaction. In a variation of the system 100, the transcription module 120 and the labeling module 160 are combined in a single module that carries out both transcription and labeling in parallel, either in real time or batch processing mode.

The voice profiles in the voice profile database 150 may be obtained from analysis of training utterances previously input to the system 100, corresponding to each participant in a group interaction. In a further embodiment, the labeling module 160 labels transcript lines with speaker identifiers without reference to a voice profile database 150, but instead generates voice profiles from analysis of the audio utterances in the audio source data 110 corresponding to the different transcript lines, either in real time or in batch processing mode. Conventional audio feature extraction and clustering techniques, may be used for this purpose, with each generated profile corresponding to the features of a cluster of similar-featured utterances. The labeling module 160 stores the generated voice profiles in the voice profile database 150 for later use in labeling transcripts 130.

In an alternative embodiment, the audio source data 110 is obtained from a plurality of microphones (not shown), and therefore comprises multiple synchronized audio streams, each stream corresponding to one microphone. If the system 110 is to operate in batch processing mode, this partitioning is preserved in the recorded source data 110. The labeling module 160 assumes that each microphone is primarily associated with a single speaker in a structured group interaction such as a panel discussion or court hearing. The labeling module 160 then simply labels each transcript line with the speaker identifier corresponding to the stream from which the corresponding utterance primarily originated. The primary origin of each utterance may be determined from the relative amplitudes of the utterance as recorded in each synchronized audio stream.

The generated conversation path 170 is optionally edited (step 430, shown as a dashed box in FIG. 4) by a user of the system 100 through an editing module 180, which also has access to the audio source data 110. The main purpose of the editing is to correct errors in the speaker identification in the conversation path 170 by the labeling module 160. A user interface module 140 manages the interaction between the user and the editing module 180 and facilitates the editing, for example by offering a drag-and-drop-style interface. The editing module 180 may also allow the user to edit the transcript lines to correct transcription errors by the transcription module 120. The editing history of the conversation path 170 may be stored along with the conversation path itself.

As an example, consider the simple exemplary conversation path in Table 1, where the left column comprises the successive transcript lines, the centre column their respective starting times (hh:mm:ss), and the right column the corresponding speaker identifiers:

TABLE 1

Example conversation path

| | | |
|---|---|---|
| Hi, how are you? | 13:04:32 | Speaker1 |
| I am fine | 13:04:48 | Speaker2 |
| Where is the agenda? | 13:04:55 | Speaker3 |
| And how are you? | 13:05:01 | Speaker3 |

The user of the editing module 180 realizes that the last line has been incorrectly labeled with the speaker identifier "speaker3" based on the logical flow of the conversation, and hence uses the editing module 180 to re-label that line with the speaker identifier "speaker2", yielding the edited conversation path of Table 2:

TABLE 2

Example conversation path of Table 1, after editing

| | | |
|---|---|---|
| Hi, how are you? | 13:04:32 | Speaker1 |
| I am fine | 13:04:48 | Speaker2 |
| Where is the agenda? | 13:04:55 | Speaker3 |
| And how are you? | 13:05:01 | Speaker2 |

The (possibly edited) conversation path 170 is associated (step 440) with a subset 175 of the voice profiles in the voice profile database 150 to form a representation 190 of the group interaction. The subset 175 comprises each voice profile corresponding to an identified speaker in the conversation path 170. The representation 190 may be stored for later retrieval or transmitted to a remote location.

In an optional step 450 of the method 400 (shown as a dashed box in FIG. 4), the user associates, using the editing module 180, auxiliary data 195 with the conversation path 170. The auxiliary data 195 may be media data such as snapshot images of whiteboards or demonstration videos, or documents. The auxiliary data 195 is generated or retrieved by participants in the group interaction or by the user of the editing module 180, and stored in a separate database (not shown) associated with the location of the audio source data 110. The user of the editing module 180 may associate the auxiliary data 195 with the conversation path 170 with appropriate timing information, for example by associating a snapshot image of a whiteboard at a particular time with the transcript line corresponding to that time. Depending on the format of the representation 190, the associated auxiliary data could be embedded within the conversation path 170, or, as illustrated in FIG. 1, associated as a distinct item 195 within the representation 190, and linked to by links inserted in the conversation path 170.

In an alternative embodiment, the system 100 inserts certain qualifiers to the bare lines of text in the transcript 130, conveying how the corresponding utterance was spoken during the interaction. Such qualifiers, estimated and inserted by the transcription module 120 or the labelling module 160 from the pitch and timing characteristics of the utterance corresponding to the transcript line, assist in the eventual reproduction of the group interaction with greater authenticity and interest to the listener. One such qualifier could be the emotional content of the corresponding utterance, e.g. humorous, emphatic, or angry. Another such qualifier could be the national or regional accent with which the utterance was spoken.

Figure 2:
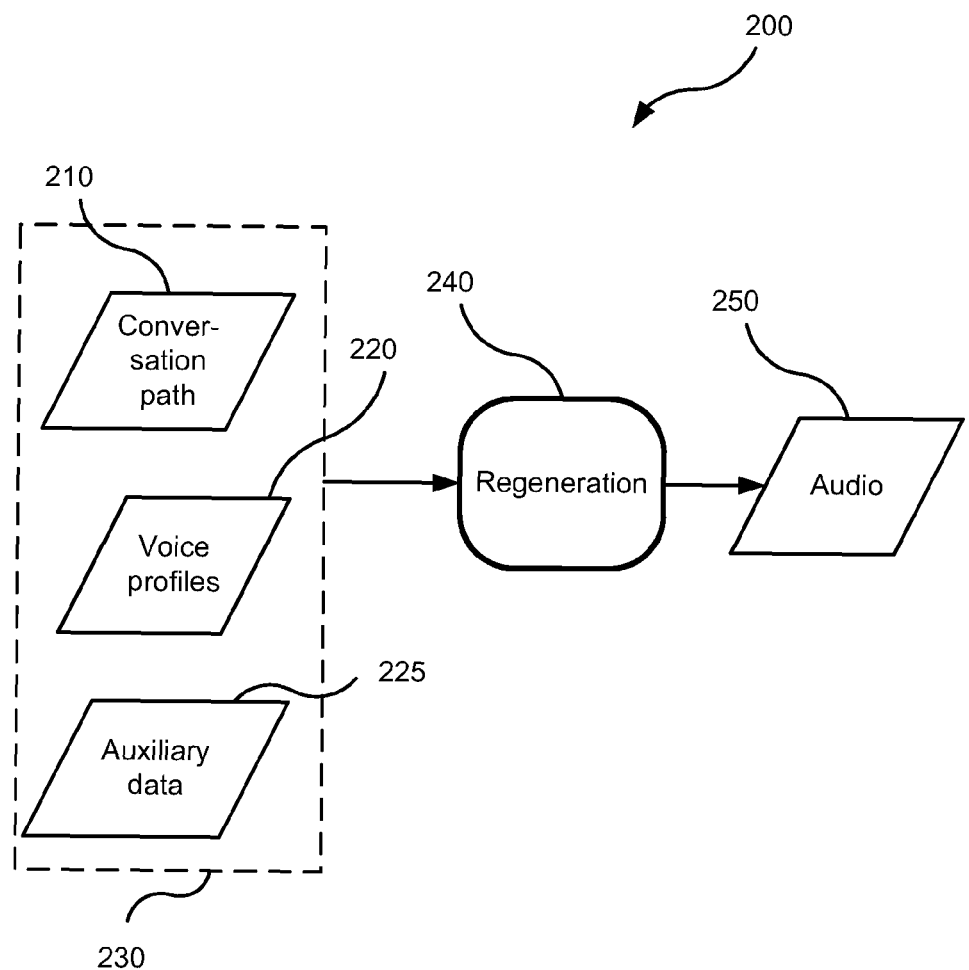
FIG. 2 is a block diagram of a regeneration system for group interactions according to one embodiment of the invention.

FIG. 2 is a block diagram of a regeneration system 200 for group interactions according to one embodiment of the invention. The input to the system 200 is a representation 230 of a group interaction. The representation 230 corresponds to the representation 190 generated by the system 100 of FIG. 1, and comprises a conversation path 210 (corresponding to 170 in FIG. 1), voice profile data 220 (corresponding to 175 in FIG. 1), and (optionally) auxiliary data 225 (corresponding to 195 in FIG. 1). A regeneration module 240 regenerates audio data 250 for the group interaction from the representation 230 according to conventional text to speech processing methods. The audio data 250 may be passed to an audio system (not shown) for reproduction into sound, or stored on an audio recording medium (not shown).

The regeneration module 240 is capable of modulating the regenerated speech data from the transcript lines depending on any qualifiers in the conversation path 210, e.g. emotion or accent as described above. Such modulation lends greater interest and authenticity to the final audio reproduction.

The regeneration module 240 is also capable of reproducing relevant parts of the auxiliary data 225 in synchronism with the regenerated audio data using the timing information describing how the auxiliary data 225 is associated with the conversation path 210. According to this embodiment, if (for example) a page of a document in the auxiliary data 225 is associated with a certain transcript line in the conversation path 210, the regeneration module 240 reproduces that document page at the same time as the audio data regenerated from that transcript line.

Figure 3:
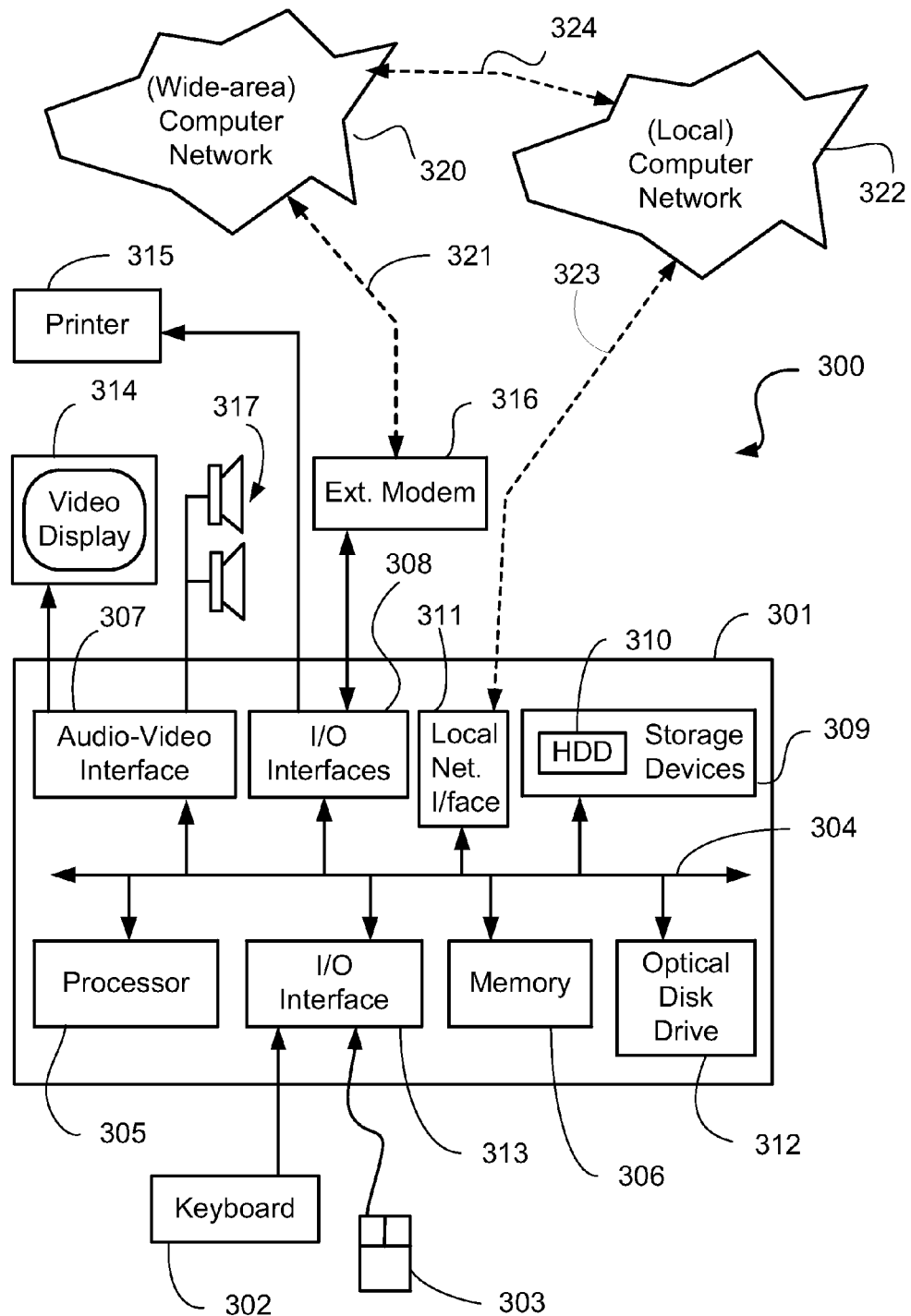
FIG. 3 is a schematic block diagram of a general purpose computer upon which arrangements described can be practiced.

The modules 120, 140, 160, 180, and 240 of FIGS. 1 and 2 may be implemented using a computer system 300, such as that shown in FIG. 3 wherein the modules 120, 140, 160, 180, and 240 may be implemented as software executable within the computer system 300. In particular, the modules 120, 140, 160, 180, and 240 are effected by instructions that are carried out within the computer system 300. The modules may be classified in two categories, in the first of which the modules 120, 160, 180, and 240 perform the processing and in the second of which the module 140 manages a user interface between the modules in the first category and the user. The software may be stored in a computer readable medium, including the storage devices described below, for example. The software is loaded into the computer system 300 from the computer readable medium, and then executed by the computer system 300. A computer readable medium having such software or computer program recorded on it is a computer program product. The use of the computer program product in the computer system 300 preferably effects an advantageous system for speech to text transcription for group interactions.

As seen in FIG. 3, the computer system 300 is formed by a computer module 301, input devices such as a keyboard 302 and a mouse pointer device 303, and output devices including a printer 315, a display device 314 and loudspeakers 317. An external Modulator-Demodulator (Modem) transceiver device 316 may be used by the computer module 301 for communicating to and from a communications network 320 via a connection 321. The network 320 may be a wide-area network (WAN), such as the Internet or a private WAN. Where the connection 321 is a telephone line, the modem 316 may be a traditional "dial-up" modem. Alternatively, where the connection 321 is a high capacity (e.g.: cable) connection, the modem 316 may be a broadband modem. A wireless modem may also be used for wireless connection to the network 320.

The computer module 301 typically includes at least one processor unit 305, and a memory unit 306 for example formed from semiconductor random access memory (RAM) and read only memory (ROM). The module 301 also includes an number of input/output (I/O) interfaces including an audio-video interface 307 that couples to the video display 314 and loudspeakers 317, an I/O interface 313 for the keyboard 302 and mouse 303 and optionally a joystick (not illustrated), and an interface 308 for the external modem 316 and printer 315. In some implementations, the modem 316 may be incorporated within the computer module 301, for example within the interface 308. The computer module 301 also has a local network interface 311 which, via a connection 323, permits coupling of the computer system 300 to a local computer network 322, known as a Local Area Network (LAN). As also illustrated, the local network 322 may also couple to the wide network 320 via a connection 324, which would typically include a so-called "firewall" device or similar functionality. The interface 311 may be formed by an Ethernet circuit card, a wireless Bluetooth™ or an IEEE 802.11 wireless arrangement.

The interfaces 308 and 313 may afford both serial and parallel connectivity, the former typically being implemented according to the Universal Serial Bus (USB) standards and having corresponding USB connectors (not illustrated). Storage devices 309 are provided and typically include a hard disk drive (HDD) 310. Other devices such as a floppy disk drive and a magnetic tape drive (not illustrated) may also be used. An optical disk drive 312 is typically provided to act as a non-volatile source of data. Portable memory devices, such optical disks (e.g.: CD-ROM, DVD), USB-RAM, and floppy disks for example may then be used as appropriate sources of data to the system 300.

The components 305 to 313 of the computer module 301 typically communicate via an interconnected bus 304 and in a manner which results in a conventional mode of operation of the computer system 300 known to those in the relevant art. Examples of computers on which the described arrangements can be practised include IBM-PC's and compatibles, Sun Sparcstations, Apple Mac™ or like computer systems evolved therefrom.

Typically, the software modules discussed above are resident on the hard disk drive 310 and read and controlled in execution by the processor 305. Intermediate storage of such modules and any data fetched from the networks 320 and 322 may be accomplished using the semiconductor memory 306, possibly in concert with the hard disk drive 310. In some instances, the software may be supplied to the user encoded on one or more CD-ROM and read via the corresponding drive 312, or alternatively may be read by the user from the networks 320 or 322. Still further, the software can also be loaded into the computer system 300 from other computer readable media. Computer readable media refers to any storage medium that participates in providing instructions and/or data to the computer system 300 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second category of modules mentioned above may be executed to implement one or more graphical user interfaces (GUIs) to be rendered or otherwise represented upon the display 314. Through manipulation of the keyboard 302 and the mouse 303, a user of the computer system 300 and the application may manipulate the interface to provide controlling commands and/or input to the applications associated with the GUI(s).

The modules 120, 140, 160, 180, and 240 may alternatively be implemented in dedicated hardware such as one or more integrated circuits performing the functions or sub functions of modules 120, 140, 160, 180, and 240. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiments being illustrative and not restrictive.

What is claimed is:

1. A system for generating a representation of a group interaction, comprising:
    a memory that stores a plurality of voice profiles; and
    a processor programmed to:
        generate a transcript of the group interaction from audio source data representing the group interaction, the transcript comprising a sequence of lines of text, each line corresponding to an audible utterance in the audio source data;
        generate a conversation path from the transcript by labeling each transcript line with an identifier identifying a speaker of the corresponding audible utterance in the audio source data; and
        generate the representation of the group interaction by associating the conversation path with the plurality of voice profiles, each voice profile corresponding to the identified speaker in the conversation path.

2. The system of claim 1, where the processor is further programmed to edit the conversation path by re-labeling at least one transcript line with a different identifier.

3. The system of claim 1, where the processor is further programmed to associate the conversation path with auxiliary data.

4. The system of claim 3, where the auxiliary data is media data.

5. The system of claim 3, where the auxiliary data is a document.

6. The system of claim 3, where the processor is further programmed to regenerate audio data from the generated representation of the group interaction.

7. The system of claim 6, where the processor is further programmed to reproduce at least part of the auxiliary data in synchronism with the regenerated audio data.

8. The system of claim 7, where, in being programmed to regenerate the audio data from the generated representation of the group interaction, the processor is programmed to regenerate the audio data using timing information associating the auxiliary data with at least one transcript line.

9. The system of claim 1, where the audio source data comprises plural synchronized audio streams, and where in being programmed to generate the conversation path from the transcript by labeling each transcript line with the identifier identifying the speaker of the corresponding audible utterance in the audio source data, the processor is programmed to label each transcript line with a speaker identifier corresponding to an audio stream from which the corresponding audible utterance primarily originated.

10. A system for regenerating audio data from a representation of a group interaction, comprising:
    a memory that stores the representation of the group interaction; and
    a processor programmed to:
        extract, from the representation of the group interaction:
            a conversation path comprising one or more transcript lines, each transcript line being labeled with an identifier identifying a speaker; and
            a plurality of voice profiles, each voice profile corresponding to the identified speaker in the conversation path; and
        regenerate audio data for the group interaction from the conversation path and the voice profiles.

11. The system of claim 10, where the processor is further programmed to:
    extract qualifiers from the conversation path; and
    modulate the audio data based upon the extracted qualifiers.

12. The system of claim 10, where the processor is further programmed to:
    extract auxiliary data from the representation; and
    reproduce at least part of the auxiliary data in synchronism with the regenerated audio data.

13. The system of claim 12, where the auxiliary data is media data.

14. The system of claim 12, where the auxiliary data is a document.

15. A computer program product for regenerating audio data from a representation of a group interaction, comprising:
    a computer readable storage device having computer readable program code embodied therewith, where the computer readable program code when executed on a computer causes the computer to:
        extract, from the representation of the group interaction:
            a conversation path comprising one or more transcript lines, each transcript line being labeled with an identifier identifying a speaker; and
            a plurality of voice profiles, each voice profile corresponding to the identified speaker in the conversation path; and
        regenerate audio data for the group interaction from the conversation path and the voice profiles.

16. The computer program product of claim 15, where the computer readable program code when executed on the computer further causes the computer to:
    extract qualifiers from the conversation path; and
    modulate the audio data based upon the extracted qualifiers.

17. The computer program product of claim 15, where the computer readable program code when executed on the computer further causes the computer to:
    extract auxiliary data from the representation; and
    reproduce at least part of the auxiliary data in synchronism with the regenerated audio data.

18. The computer program product of claim 17, where the auxiliary data is media data.

19. The computer program product of claim 17, where the auxiliary data is a document.

* * * * *